April 19, 1932.  S. TETREAULT  1,854,723
TRACTOR PLOW CONTROLLER SAFETY HITCH
Filed Jan. 10, 1930  2 Sheets-Sheet 1
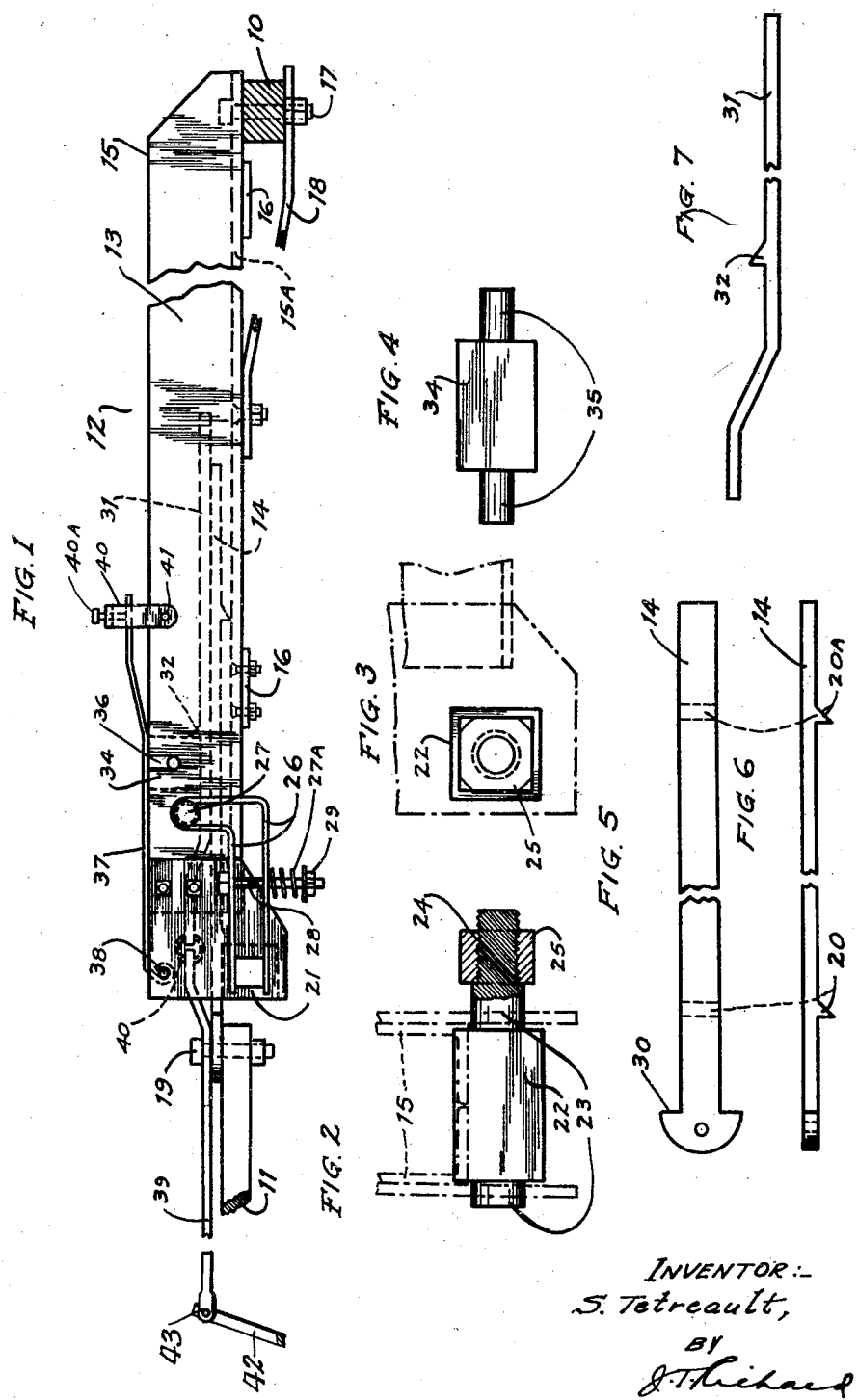
INVENTOR:-
S. Tetreault,
BY
J. T. Richard
ATTORNEY.

April 19, 1932.  S. TETREAULT  1,854,723
TRACTOR PLOW CONTROLLER SAFETY HITCH
Filed Jan. 10, 1930   2 Sheets-Sheet 2
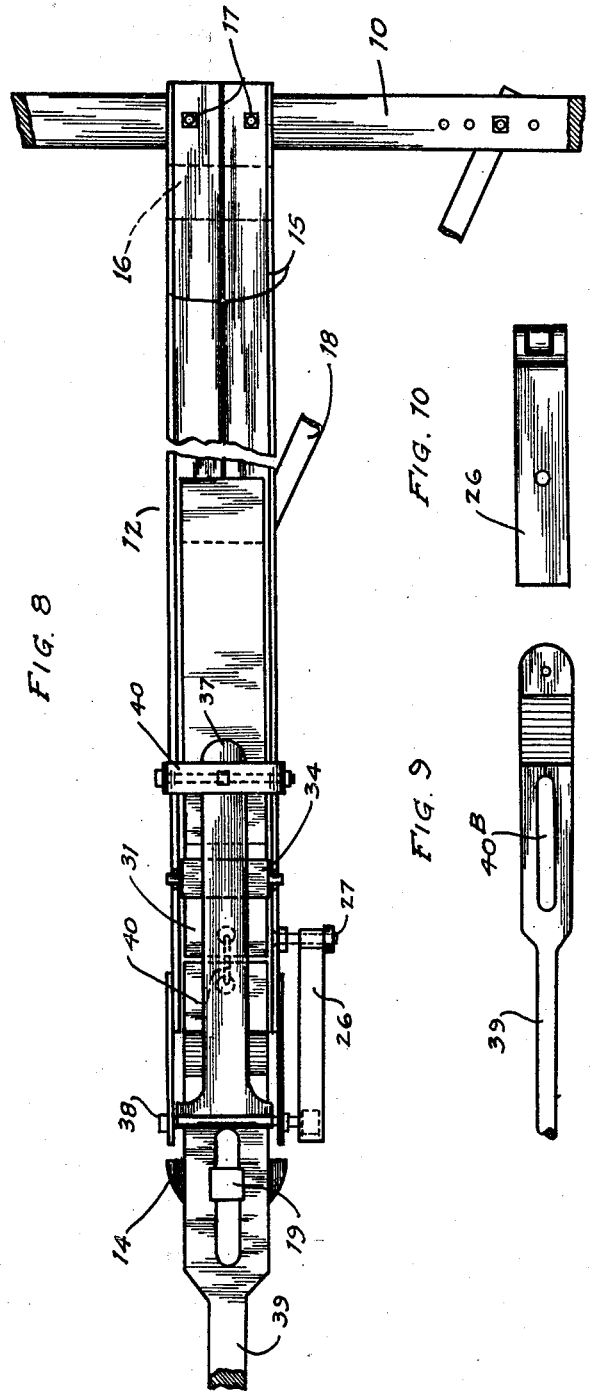
INVENTOR :-
S. Tetreault,
BY
ATTORNEY.

Patented Apr. 19, 1932

1,854,723

UNITED STATES PATENT OFFICE

SYLVA TETREAULT, OF ST. PAUL, ALBERTA, CANADA

TRACTOR PLOW CONTROLLER SAFETY HITCH

Application filed January 10, 1930. Serial No. 419,783.

This invention relates to a safety hitch and power controller.

The primary object of the invention is to provide a hitch device between a tractive or driving machine and a driven or drawn object such as a tractor and plow, respectively, whereby the maximum tractive effort to which the object is to be subjected may be varied or controlled to meet certain safety requirements, the hitch operating to release the object upon the predetermined tractive effort being reached.

Another object is to control the driving power, by cutting it off shortly after the driven object is released.

Another object is to make such a device to a simple and strong construction; and besides other objects such as will appear as the specification is read in the light of the drawings, it is an object of the invention to improve on such devices.

In the drawings:

Figure 1 is a side elevation of my hitch complete, broken in part, showing in section the cross bar of say a plow and part of the draw bar of say a tractor;

Figure 2 is a front assembly view of the latch device, less the spring-actuated clasp levers, parts being shown in section;

Figure 3 is a side view of Figure 2;

Figure 4 is a front elevation of the block of the latch device associated with the member operating the tractor clutch lever;

Figure 5 is a plan view of the member connected to the tractor draw bar;

Figure 6 is a side elevation of Figure 5;

Figure 7 is a side elevation of the member operating the tractor clutch lever;

Figure 8 is a plan view of Figure 1;

Figure 9 is a fragmentary plan view of the connection to the tractor clutch lever.

Figure 10 is a top plan view of the clasp levers forming part of the latch device associated with the member connected to the tractor draw bar;

Figure 11 is a front elevation of the clevis used with the latch device associated with the tractor clutch lever control.

Like numerals of reference indicate corresponding parts in the various figures.

Referring by numerals to the drawings, 10 indicates the cross bar of a plow or other driven object (not shown) and 11, part of the draw bar of a tractor (not shown) used to draw the plow, my safety hitch, indicated in its entirety by numeral 12, being connected at one end to the draw bar and at the other end to the cross bar.

My hitch comprises essentially a member or box 13, from which projects a connection 14 to the draw bar releasably locked in a fixed relation to the box to normally draw the plow with the tractor but sliding relatively to the box to release the plow as it encounters an appreciable resistance, and of a second connection to the tractor clutch lever from the box the function of which is to operate the clutch so as to stop the tractor shortly after the plow is released; the hitch thus operates to first release the plow and then the clutch, or gear, according as to the make of the tractor.

As shown, the box comprises two angles 15 connected together by spacers or bars 16, the box or more particularly the angles being connected at one end to the plow cross bar 10 as with bolts 17 to thus form in effect, part of the plow; preferably, side braces 18 between the box and the cross bar, are used to take care of the side draft.

In the box is mounted the draft bar or connection 14 before alluded to, which is connected at the forward end to the tractor draw bar as with bolt or king pin 19. The bar 14 rests on the horizontal legs 15A of the angles 15 and is formed with a lug or shoulder 20; co-operating with the lug 20 is a latch or lock 21 spring-held normally in a position to be engaged by the lug to thus determine or prevent the movement forwardly of the draw bar, but operating to allow the draw bar to slide in the box to thus release the plow upon the plow encountering a predetermined resistance. The lock is thus formed with a main portion or block 22 of square cross section having stud ends or journals 23 turning in the box; one stud end is reduced and threaded as at 24 to receive a square nut 25; the lug, by its engagement with the block 22 normally prevents the sliding of the draw bar forwardly, so that the plow is drawn forwardly with and by the tractor; if however the block is allowed to turn on the studs, the lug finally slides or slips forwardly and the plow is released, the tractor continuing forwardly while the plow stops.

To normally retain the lug in a position to remain in operative engagement with the block, to thus cause the plow to be drawn by the tractor, two levers 26 are pivoted as at and turn on a pin or bolt 27 in the box which extend to engage two opposed faces of the block 22, and a coil spring 27A encircling a bolt 28 passed through both levers is compressed to urge the levers toward one another; the turning moment on the block required to overcome the spring 27A, which varies with the pull on the plow, may be varied by turning the nut 29 on the bolt 28 to alter the effective length of the coil spring. Thus the maximum resistance offered by the plow as it is being pulled forwardly by the tractor may be predetermined by adjusting the length of the spring.

A third member or draw bar 31 is mounted in the box to slide on the member 14, and this member 31 is connected at the forward end with a rod or connection 39 by means of a link 40°; this connection 39 is slotted as at 40B to slide on the king pin 19, and is suitably connected at the forward end as at 43 to the tractor clutch lever 42, shown in part only, so that any relative movement of the tractor and member 31 will cause the clutch lever to be operated to either connect or disconnect the tractor engine. The member 31 is formed with a lug 32 which normally engages with a latch block 34 of square cross section which has end studs or journals 35 turning in the box; as the latch device 21 operates to release the plow, that is to allow the member 14 to slide in the box and move with the tractor, the member 31 by the engagement of its lug 32 with the block 34 is prevented from movement with the tractor, so that there results an outward relative movement of this member with the tractor that operates the clutch lever to disconnect the engine.

As the tractor may not come to a stop immediately after the clutch lever has been operated to disconnect the engine, the slot 40B is made to such length that the king pin 19 will engage the forward end of the slot just before the clutch has been fully operated, so that the clutch lever will not be subjected to any greater pull than is necessary to operate it and this pull now transferred to the member 14.

For the same reason that the tractor may not come to a stop immediately after the clutch lever is operated to disconnect the engine, a second latch device must be capable of yielding to allow the member 31 to move with the tractor after the clutch lever has been operated to disconnect the engine.

As shown, a spring 37 pivoted as at 38 in the box, engages the top face of the block 34 and is retained over the block by a screw 40A threaded through a clevis 40 pivoted as at 41 in the box. By turning the screw in the clevis, the pressure brought to bear on the block may be varied or adjusted. The block pivots 35 are mounted in slots 36 to allow the block to shift upwardly and allow the draw bar 14 to move upwardly as it is being raised by the turning of the block 22, and to also permit of the member 31 rising as it turns the block 34.

The draw bar 14 is formed with shoulders 30 to engage the forward end of the box to thus enable the tractor to push the plow rearwardly.

The member 14 is preferably provided with a second lug 20A, positioned rearwardly of the lug 20, the function of which is to prevent this member from sliding entirely out of the box once the plow has been released.

*Operation*

The device is hitched between the tractor and the plow, by connecting the member 14 to the tractor draw bar 11 by means of the king pin 19, and to the cross beam 10 of the plow by means of the bolts 17.

Any excessive pull by the tractor, such as may be occasioned upon the plow encountering an obstruction or resistance, will cause the block 22 to turn against the pressure developed by the clasp levers 26, the lug 20 slipping over the block to release the member 14, the block 34 in the meantime rising in the box 12.

Upon the release of the member 14 which now moves with the tractor, the member 31 and the connection 39 now being prevented from moving forwardly with the tractor, the tractor clutch lever will be gradually operated to disconnect the engine and therefore stop the tractor.

The block 34 thus operates to first resist the member 31 and operate the clutch lever, and then release the member.

By operating the tractor rearwardly, the members 14 and 31 are gradually forced back into normal or operative position.

What I claim is:

1. A device of the class described comprising a box member adapted to be connected to a cross bar of an agricultural implement, a draft bar slidable in the box member and adapted to be connected to a tractor draw bar, a rotatable lock co-operating with the first draft bar, spring controlled means retaining the rotatable lock in normal position, a second draft bar slidable on the first draft bar, a rod connected at one end to the second draft bar and adapted to be connected to a clutch lever of a tractor, a king pin connecting the first draft bar, the tractor draw bar and the rod in co-operative relation, and a latch block co-operating with the second draft bar.

2. The device claimed in claim 1, in which the latch block is slidably mounted and the second draft bar is provided with lugs to co-operate with the latch block.

Signed at the city of Ottawa, this 30th day of November, 1929.

SYLVA TETREAULT.